United States Patent
Linden et al.

(10) Patent No.: US 8,736,272 B2
(45) Date of Patent: May 27, 2014

(54) ADJUSTABLE SPECTRUM LED SOLAR SIMULATOR SYSTEM AND METHOD

(75) Inventors: Kurt J. Linden, Wayland, MA (US);
William R. Neal, Bedford, MA (US);
Harvey Serreze, Pepperell, MA (US)

(73) Assignee: Spire Corporation, Bedford, MA (US)

( * ) Notice: Subject to any disclaimer, the term of this patent is extended or adjusted under 35 U.S.C. 154(b) by 33 days.

(21) Appl. No.: 13/373,780

(22) Filed: Nov. 30, 2011

(65) Prior Publication Data

US 2013/0134885 A1    May 30, 2013

(51) Int. Cl.
*G01R 31/00*    (2006.01)
*H05B 37/00*    (2006.01)

(52) U.S. Cl.
USPC ...... 324/403; 324/761.01; 315/160; 315/170; 315/151

(58) Field of Classification Search
USPC ............ 315/160, 174; 324/761.01, 750, 752, 324/765
See application file for complete search history.

(56) References Cited

U.S. PATENT DOCUMENTS

| | | | |
|---|---|---|---|
| 6,548,819 B1 * | 4/2003 | Lovelady | 250/495.1 |
| 7,067,831 B2 * | 6/2006 | Ahrens et al. | 250/495.1 |
| 7,411,408 B2 * | 8/2008 | Shimotomai et al. | 324/754.23 |
| 7,425,457 B2 | 9/2008 | Tokutake et al. | |
| 7,514,931 B1 * | 4/2009 | Shimotomai et al. | 324/403 |
| 7,528,615 B2 * | 5/2009 | Shimotomai | 324/754.23 |
| 2005/0056312 A1 | 3/2005 | Young et al. | |
| 2011/0241719 A1 * | 10/2011 | Shr et al. | 324/761.01 |
| 2013/0063174 A1 * | 3/2013 | Ooto et al. | 324/761.01 |
| 2013/0069687 A1 * | 3/2013 | Ooto et al. | 324/761.01 |

OTHER PUBLICATIONS

Brochure entitled Spi-Sun Simulator™ SLP, www.spiresolar.com Rev G Jan. 2011, 6 pgs. (unnumbered).

* cited by examiner

*Primary Examiner* — Vibol Tan
(74) *Attorney, Agent, or Firm* — Iandiorio Teska & Coleman, LLP

(57) ABSTRACT

An adjustable spectrum LED solar simulator method and system which provides power to LEDs, senses the LED output, compares the LED output to a predetermined norm, and adjusts the LED outputs accordingly. An adjustable spectrum LED solar simulator system includes a multiplicity of LEDs of a number of different color wavelength ranges, an LED driver system for providing power to the LEDs, a sensor system for sensing the output of the LEDs and a controller responsive to the sensor system for comparing the color spectrum of the output of the LEDs to a desired solar spectrum and enables the driver system to adjust the power to the LEDs to more closely match the desired solar spectrum. The solar simulator system may include a modulator structure of hierarchical assemblies. Solar simulator calibration is also disclosed.

38 Claims, 10 Drawing Sheets

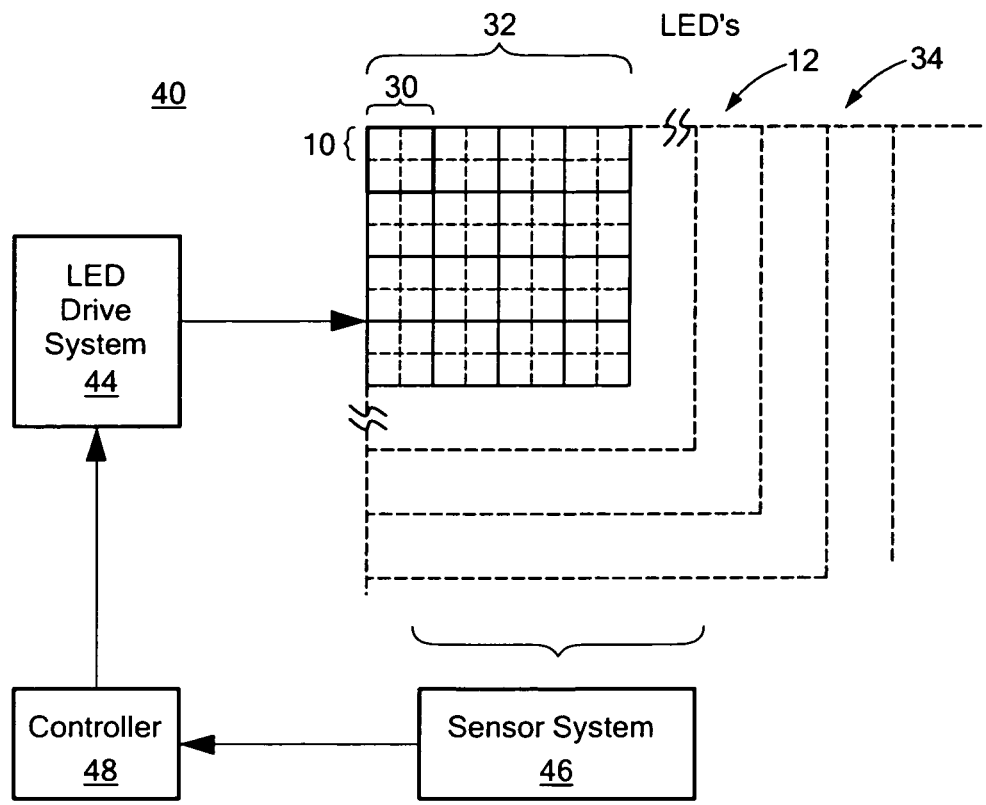
FIG. 5
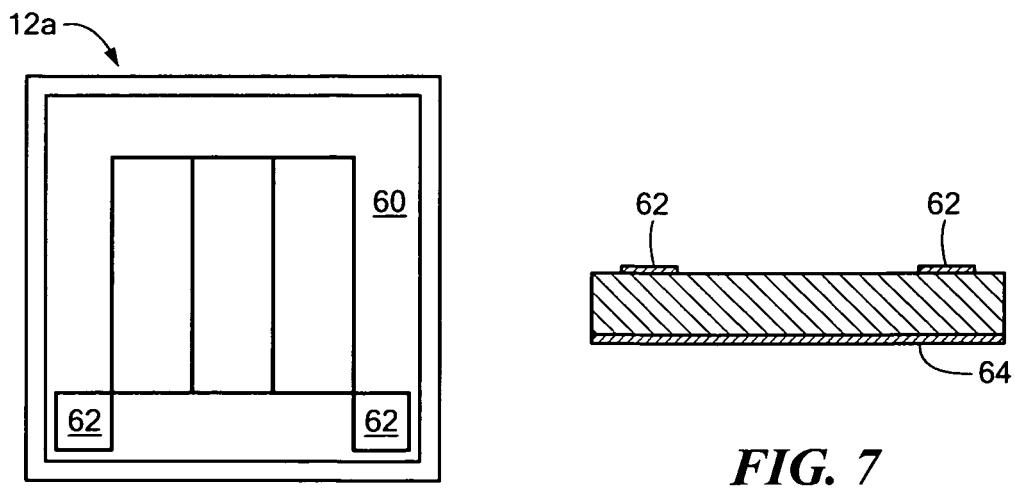
FIG. 6
FIG. 7

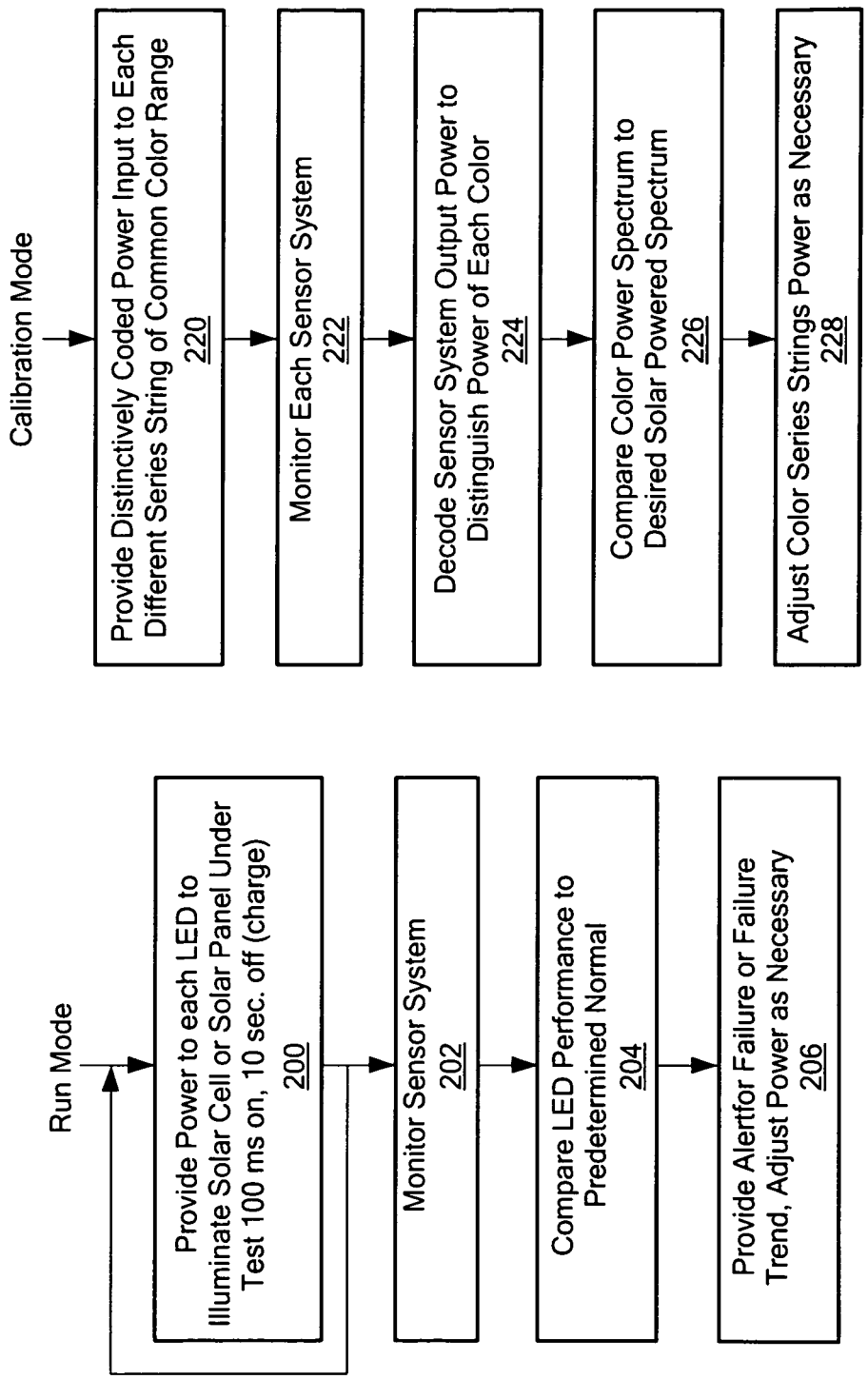

ADJUSTABLE SPECTRUM LED SOLAR SIMULATOR SYSTEM AND METHOD

GOVERNMENT RIGHTS

This invention was made with U.S. Government support under DOE Phase I SBIR Grant No. DE-SC0004842, Jun. 19, 2010-Mar. 18, 2011. The Government may have certain rights in the subject invention.

FIELD OF THE INVENTION

This invention relates to an adjustable spectrum LED solar simulator system and method.

BACKGROUND OF THE INVENTION

An important step in the manufacture of photovoltaic (PV) solar modules is their final test under simulated solar illumination. The manufacture of modules to produce megawatts of solar-generated power requires accurate and rapid testing of tens of thousands of modules. Solar simulators to perform this testing are commercially available from many solar equipment manufacturers. In spite of advances in the performance of these simulators, numerous areas for improvement remain. Specifically, three main issues need to be addressed.

The first issue is spectral accuracy. Solar spectrum standards have been set by two principal organizations, IEC and ASTM International. A Class A simulator spectrum is essentially defined as one that falls within ±25% of the Air Mass 1.5 Global (AM1.5G) spectrum in each of six defined spectral intervals. While such a wide tolerance about a standard spectrum may be acceptable for crystalline silicon modules, it is not adequate for more advanced technologies including many single-junction thin-film approaches (CdTe, CIGS, etc.) and certainly not acceptable for multi junction tandem structures. Specifications beyond Class A have been proposed by Spire Corporation of Bedford, Mass. to meet these more demanding requirements.

The second issue is equipment cost-of-ownership, maintenance, and downtime. Virtually all solar simulators commercially available today utilize xenon flashlamps for their principal source of illumination. Typical lifetimes for these lamps range from a few thousand flashes to as many as 100,000 flashes. Replacement costs are typically in the thousands of dollars per lamp, and while lamp replacement on some units can be made by the user, some simulators require trained factory personnel for lamp replacement. Even at the high end of lamp life, production operation in a 24/7 setting can still require lamp replacement every few months. Solar panel measurement time also contributes to cost-of-ownership in that the proposed LED-based solar simulator can be operated at higher pulse rates than the current xenon lamp units, possibly by a factor of three or more.

The third issue is that easier adjustability of spectral and spatial (irradiance) uniformity is needed. Most currently available simulators utilize optical filters to properly modify the xenon lamp spectrum to achieve one closely resembling AM1.5G. The consequence is that adjustment of the spectrum, if necessary, can only be made by replacing one filter set with a different one. Some simulator manufacturers utilize the approach of dual lamps, one xenon and the other halogen (or a similar incandescent source) to adjust the ratio of short wavelength (<700 nm) light to near infrared (>800 nm) light. While modest adjustments in spectra are not needed for many module types, developers or manufacturers of advanced multi-junction, tandem modules need simulators with simple adjustment.

In summary, solar simulators are needed for measuring the performance of solar cells and solar panels. These instruments currently use filtered high-intensity xenon lamps with poor spectral control, high voltage transients that can adversely affect electronic control circuits, lamp aging and a lack of easily-implemented size scaling. What is needed is a more reliable, low-voltage solid-state, spectrum-adjustable and size-scalable simulator light source approach.

SUMMARY OF THE INVENTION

In accordance with various aspects of the subject invention in at least one embodiment the invention presents an improved adjustable spectrum LED solar simulator system and method which uses a modular approach that permits easy scaling, provides spatial uniformity and spectral control and adjustability and employs the steady improvement in LEDs to provide high efficiency, long lifetimes and decreasing cost, is more reliable and virtually eliminates high voltage transient interference.

The subject invention results from the realization that, in part, an improved adjustable spectrum LED solar simulator system and method which is scalable, more efficient, less costly, longer lived and more spatially uniform and spectrally controllable and adjustable in various aspects can be achieved using a multiplicity of LEDs of a number of different spectral ranges—hereinafter referred to as "color" ranges, sensing at least a sample of their output, comparing it to a desired norm or solar spectrum and adjusting the power to the LEDs to more closely match the LED output to a norm or desired solar spectrum.

The subject invention, however, in other embodiments, need not achieve all these objectives and the claims hereof should not be limited to structures or methods capable of achieving these objectives.

This invention features an adjustable spectrum LED solar simulator system including a multiplicity of LEDs of a number of different color wavelength ranges, an LED driver system for providing power to the LEDs, a sensor system for sensing the output of the LEDs, and a controller responsive to the sensor system for comparing the color spectrum of the output of the LEDs to a desired solar spectrum and enabling the driver system to adjust the power to the LEDs to more closely match the desired solar spectrum.

In preferred embodiments the LEDs may be connected in series strings of common color range. The LED driver system may provide power separately to each of the series strings of common color range. The controller may selectively adjust the power to the series strings of common color range. There may be a beam homogenizer system responsive to the LEDs for producing a more uniform spatial intensity. The beam homogenizer may include a non-imaging beam homogenizer. The beam homogenizer may include a lens system. The lens system may include a micro-lens array. The LED driver system may include a capacitive circuit for periodically discharging power to the LEDs and recharging between the power discharges. The controller may operate in a run mode to enable the LED driver system to periodically power the LEDs. In the run mode the controller may monitor the sensor system and compare its output to a predetermined norm to determine LED dark/light performance. The controller may operate in a calibration mode to provide distinctively coded power to each of the series strings of common color range, decode the sensor system output to distinguish the power of each common color range and compare the power of each common color range to the power of those colors for a desired solar spectrum. The simulator system may be a modular structure of hierarchal assemblies: the highest order assembly being the simulator system, the lowest order assembly including a subset of the multiplicity of LEDs, each higher order assembly including a number of the next lower order assemblies. There may be a beam homogenizer system responsive to the LEDs for producing a more uniform intensity and color output. The beam homogenizer system may include a beam homogenizer device associated with each lowest order assembly. The sensor system may include a sensor device associated with each lowest order assembly. The sensor system may further include an optical device associated with each lowest order assembly to return a sample of the homogenized LED output to the sensor device. The LEDs may be connected in series strings of common color range. The series strings of common color range may be extended through at least the lowest order assemblies. There may be at least one intermediate order assembly and the series strings of common color range may extend through at least the one intermediate order assembly including its lower order assemblies.

This invention also features an adjustable spectrum LED solar simulator system including a modular structure of hierarchical assemblies including a highest order assembly, a lowest order assembly and at least one intermediate assembly, each higher order assembly including a number of next lower order assemblies, each lowest order assembly including a subset of LEDs; an LED driver system for providing power to the subsets of LEDs, a sensor system for sensing the output of the LEDs, and a controller responsive to the sensor system for comparing the color spectrum of the output of the LEDs to a desired solar spectrum and enabling the driver system to adjust the power to the LEDs to more closely match the desired solar spectrum.

In preferred embodiments the LEDs may be connected in series strings of common color range. The LED driver system may provide power separately to each of the series strings of common color range. The controller may selectively adjust the power to the series strings of common color range. There may be a beam homogenizer system responsive to the LEDs for producing a more uniform intensity and color output. The beam homogenizer system may include a beam homogenizer device associated with each lowest order assembly. The sensor system may include a sensor device associated with each lowest order assembly. The sensor system may further include an optical device associated with each lowest order assembly to return a sample of the homogenized LED output to the sensor device. The series strings of common color range may be extended through at least the lowest order assemblies. There may be at least one intermediate order assembly and the series strings of common color range may extend through at least the one intermediate order assembly including its lower order assemblies. The LED driver system may include a capacitive circuit for periodically discharging power to the LEDs and recharging between the power discharges. The controller may operate in a run mode to enable the LED driver system to periodically power the LEDs. In the run mode the controller may monitor the sensor system and compare its output to a predetermined norm to determine LED dark/light performance. The controller may operate in a calibration mode to provide distinctively coded power to each of the series strings of common color range, decode the sensor system output to distinguish the power of each common color range and compare the power of each common color range to the power of those colors for a desired solar spectrum. The highest order assembly may include the simulator system itself.

The invention also features an adjustable spectrum LED solar simulator method including providing power to LEDs, sensing LED output, comparing LED output to a predetermined norm, and adjusting the LED outputs.

This invention also features an adjustable spectrum LED solar simulator calibration method including providing distinctively coded power to each of a series of strings of LEDs of common color range, sensing LED output, decoding sensed LED output to distinguish the power of each common color range, comparing the power of each common color range to the powers of those colors for a desired solar spectrum, and adjusting the power to the LEDs to more closely match the desired solar spectrum.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 1 is the lowest order assembly, e.g. a sub-block;

FIG. 2 is an intermediate order assembly, e.g. a block;

FIG. 3 is another, higher intermediate assembly, e.g. a tile; and FIG. 4 is the highest order assembly, e.g. the simulator;

FIG. 5 is a simplified schematic block diagram of an adjustable spectrum LED solar simulator according to one embodiment of the invention;

FIGS. 6 and 7 show top plan and side crossectional views, respectively, of representative LEDs that may be used in this invention;

FIG. 19 is a diagram showing one embodiment of the simulator method run mode according to this invention; and FIG. 20 is a diagram showing one embodiment of the simulator method calibration mode according to this invention.

DETAILED DESCRIPTION OF THE INVENTION

Figure 1:
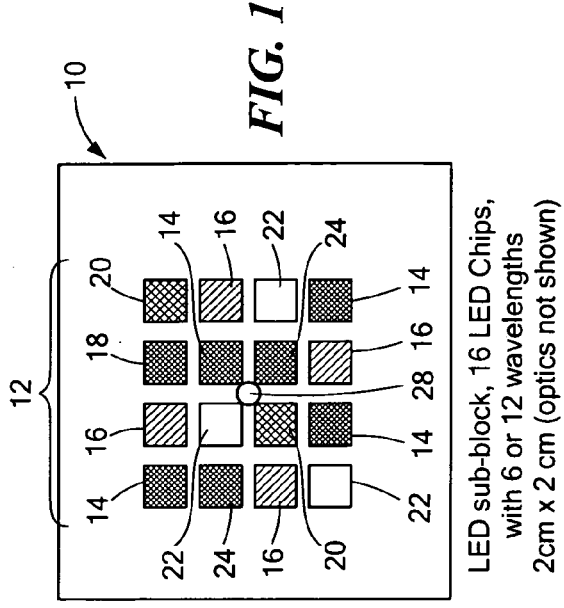
FIGS. 1-4 illustrate a modular structure of hierarchal assemblies of an adjustable spectrum LED solar simulator system according to one embodiment of the invention where

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIGS. 1-4 an adjustable spectrum LED solar simulator system according to this invention arranged in a modular structure of hierarchal assemblies including a highest order assembly, a lowest order assembly and at least one intermediate assembly. Each higher order assembly including a number of next lower order assemblies, each lowest order assembly includes a subset of LEDs. In this particular embodiment there are actually four hierarchal assemblies. The lowest order assembly, referred to as a sub-block 10, FIG. 1, may include 16 LED chips 12 with six or twelve different wavelengths symbolically referred to as "color", whether in ultraviolet, visible or near infrared range. For example, in FIG. 1 the 16 LED chips 12 include four "red" chips 14, four "orange" chips 16, one "green" chip 18, two "blue" chips 20, three "yellow" chips 22, and two "purple" chips 24. The number of different color LED chips depends in part upon the strength of the particular wavelength signal provided by the chip where the overall purpose is to get a best possible match with the solar spectrum and providing a one sun illumination where one sun equals 100 mW/cm² (over the 350-4000 nm range). The particular choices depend upon the price and power rating of the commercially available LEDs.

Figure 2:
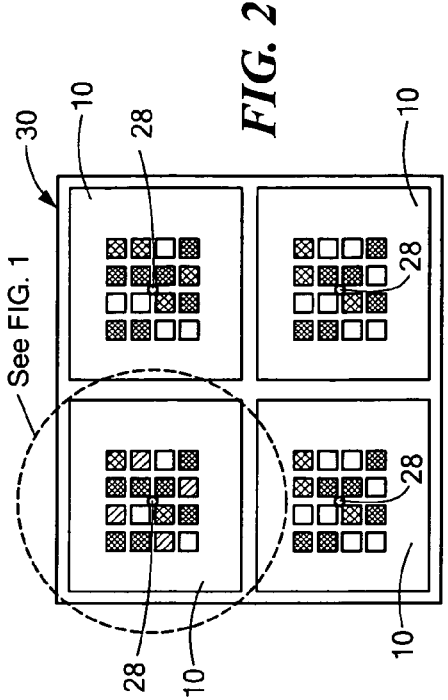
Figure 3:
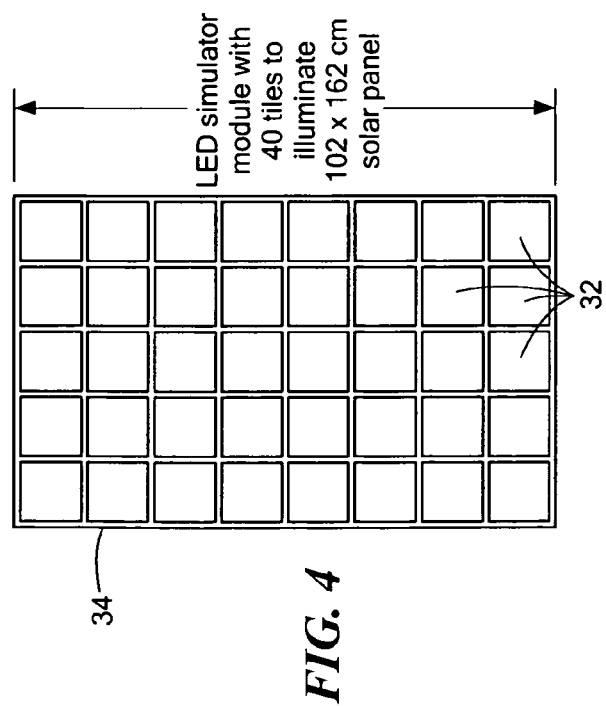
Figure 4:
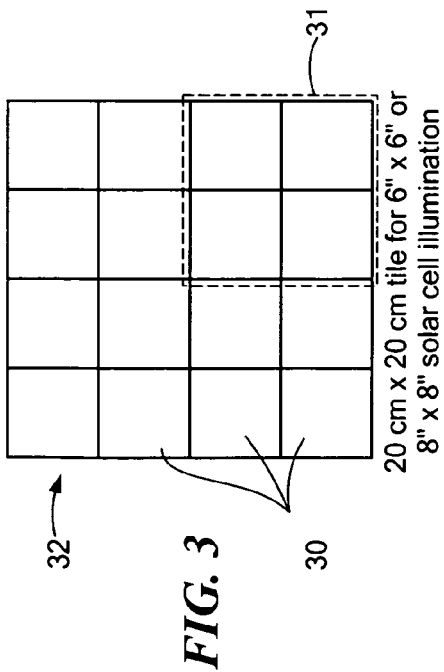

There are two intermediate order assemblies referred to as a block 30, FIG. 2 and tile 32, FIG. 3. Each block 30 includes four sub-blocks 10 and each tile 32, FIG. 3, includes 16 blocks or 64 sub-blocks. Also included in sub-block 10 in this embodiment is a photo sensor 28 for sensing the output from the 16 LEDs chips 12. Tile 32 is square, 20 cm on the side and can be used for a single six inch by six inch or eight inch by eight inch solar cell illumination. The highest order assembly, in this embodiment the simulator module itself, 34, FIG. 4, includes 40 tiles and illuminates a 102×162 cm solar panel to be evaluated. LED chips 12 are mounted onto heat-dissipating printed circuits with preprinted electrical interconnects. These printed circuit boards make up the sub-blocks. This modular construction can be used to produce LED solar simulator instruments covering arbitrarily large solar panel areas. The tile-combination strategy enables rapid and economical manufacture of solar simulators of varying size, depending upon customer requirements with easy scaling to larger and larger solar panels as they become available. This approach also allows the selection and use of LEDs which provide the most power, the best efficiency, and the lowest cost as the commercial market grows and develops. For example, Table I, below, shows the typical chips that might be used to implement the six wavelength bins ("colors") 400-500, 500-600, 600-700, 700-800, 800-900 and 900-1100, as well as their approximate operating parameters and the optical output power.

TABLE I

| LED chip wavelength region (nm) | Representative chip vendor | Approximate chip electrical operating parameters | Approximate chip optical output power (mW) |
|---|---|---|---|
| 400-500 | Cree | 45 mA, 3 V | 30 mW |
| 500-600 | Cree | 35 mA, 3 V | 19 mW |
| 600-700 | Cree | 70 mA, 3.1 V | 20 mW |
| 700-800 | III-V Compounds | 250 mA, 2.5 V | 30 mW |
| 800-900 | Marubeni | 250 mA, 2 V | 40 mW |
| 900-1100 | III-V Compounds | 250 mA, 2 V | 30 mW |

Similarly for a 12 bin arrangement, Table II shows the optical power contained in 50 nm and 100 nm wide spectral wavelength windows corresponding to 6 wavelength and 12 wavelength bin LED simulators.

TABLE II

| $\Delta\lambda$ [nm] | $P(\Delta\lambda)$ [W/m²] | $P(\Delta\lambda)/P_{Tot}$ [$\Delta\lambda$ = 50 nm] | $P(\Delta\lambda)/P_{Tot}$ [$\Delta\lambda$ = 100 nm] | ATSM [Std] | $P(\Delta\lambda)/$ Sub-block [mW] |
|---|---|---|---|---|---|
| 400-450 | 61.55 | 0.081 | 0.184 | 0.184 | 24.6 |
| 450-500 | 77.81 | 0.103 | | | 31.1 |
| 500-550 | 76.39 | 0.101 | 0.199 | 0.199 | 30.6 |
| 550-600 | 74.66 | 0.098 | | | 29.9 |
| 600-650 | 72.07 | 0.095 | 0.184 | 0.184 | 28.8 |
| 650-700 | 67.27 | 0.089 | | | 26.9 |
| 700-750 | 60.0 | 0.079 | 0.149 | 0.149 | 24.0 |
| 750-800 | 53.22 | 0.070 | | | 21.3 |
| 800-850 | 48.83 | 0.064 | 0.125 | 0.125 | 19.5 |
| 850-900 | 45.87 | 0.060 | | | 18.3 |
| 900-1000 | 56.32 | 0.074 | 0.160 | 0.159 | 22.5 |
| 1000-1100 | 64.72 | 0.085 | | | 25.9 |

$P_{Tot}$ = 758.77 W/m²
$P_{Sub\text{-}block\ (mW)}$ = 303.5

Similar selections can be made for 24 bin or any other number of bins desired. The more bins used the closer the match will be to the actual solar spectrum.

In one embodiment an adjustable spectrum LED solar simulator system 40, FIG. 5, according to one embodiment of this invention may include a multiplicity of LEDs 12 arranged in the modular structure of hierarchal assemblies including sub-blocks 10 and blocks 30.

An adjustable spectrum LED solar simulator system 40, FIG. 5, according to one embodiment of this invention includes a multiplicity of LEDs 12 of a number of different color ranges arranged in a modular structure of hierarchal assemblies such as that shown in FIGS. 1-4 including higher, lower and intermediate assembly orders such as sub-blocks 10, blocks 30, quarter tiles 31, tiles 32, and simulators 34. An LED drive system 44 provides power to the LED chips 12. A sensor system 46 includes sensor devices 28, FIGS. 1 and 2, for sensing the output of the LEDs. Controller 48 which may be implemented with a microprocessor such as a Microchip Corp., PIC family of microcontrollers programmed with among other things LabVIEW software which responds to sensor system 46 to compare the color spectrum of the output of the LEDs to a desired solar spectrum and enables the LED driver system 44 to adjust the power to the LEDs 12 to more closely match a standard or desired solar spectrum. Solar spectrum standards have been set by two principal organizations, IEC and ASTM International. A Class A spectrum is essentially defined as one that falls within ±25% of the Air Mass 1.5 Global (AM1.5G) spectrum. In one embodiment of this invention the LEDs of e.g. a quarter of one tile, are connected in series strings or chains of common color range. LED driver system 44 provides power separately to each of those series strings of common color range. The common color ranges for example, in the sub-block of FIG. 1 could be red, orange, yellow, green, blue, violet. In this way controller 48 selectively adjusts the power to the series strings of common color range in order to balance or more closely match the LED output spectrum of the system 40 with the desired solar spectrum. A typical LED chip 12a, FIGS. 6 and 7 may be an EZBright LED having a nominally 980×980 µm² area of dielectric passivation layer 60 and gold bond pads 62 with a backside metallization anode 64, FIG. 7.

Figure 8:
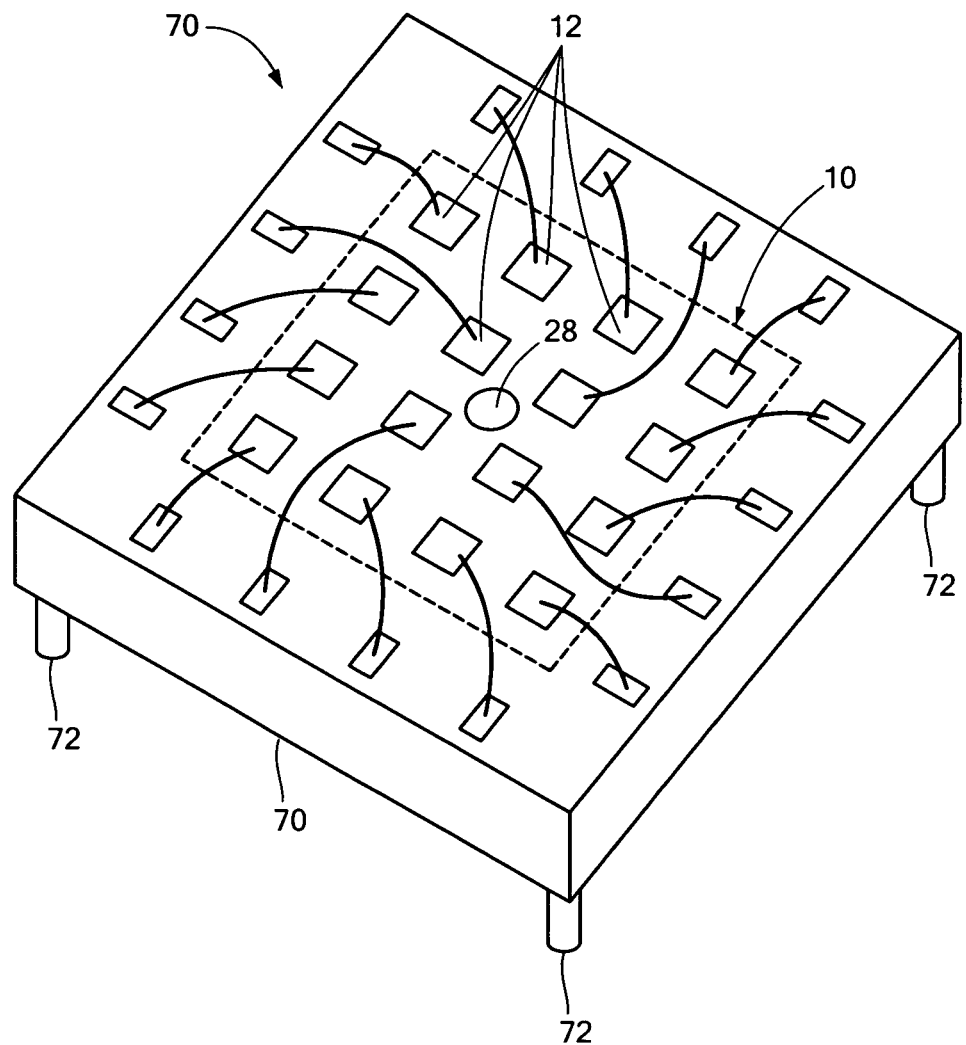
FIG. 8 is a three dimensional view of a sub-block of FIG. 1 on a metal core PCB.
Figure 9:
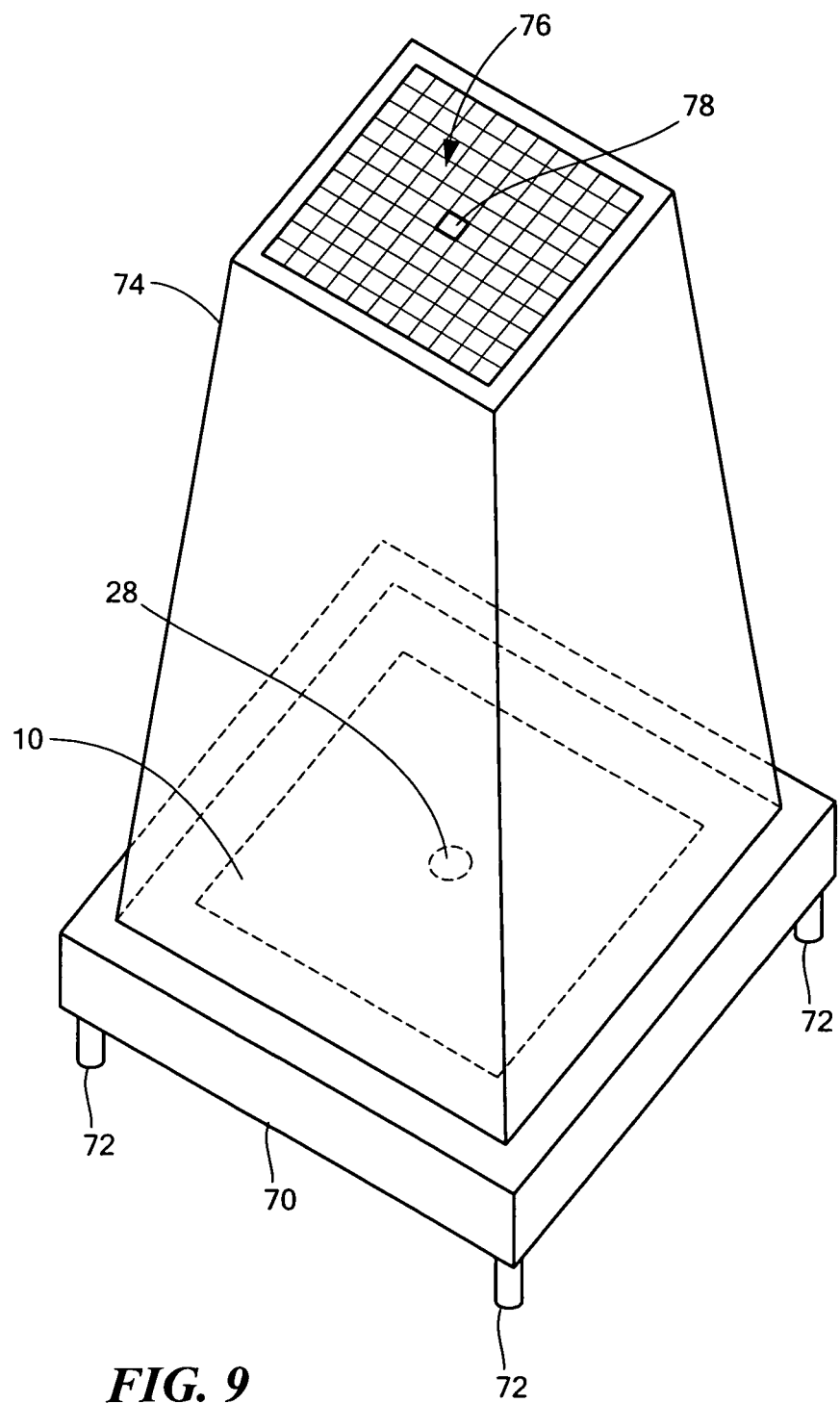
FIG. 9 is a three dimensional view of the sub-block of FIG. 8 mounted with an optical homogenizer according to one embodiment of the invention.
Figure 10:
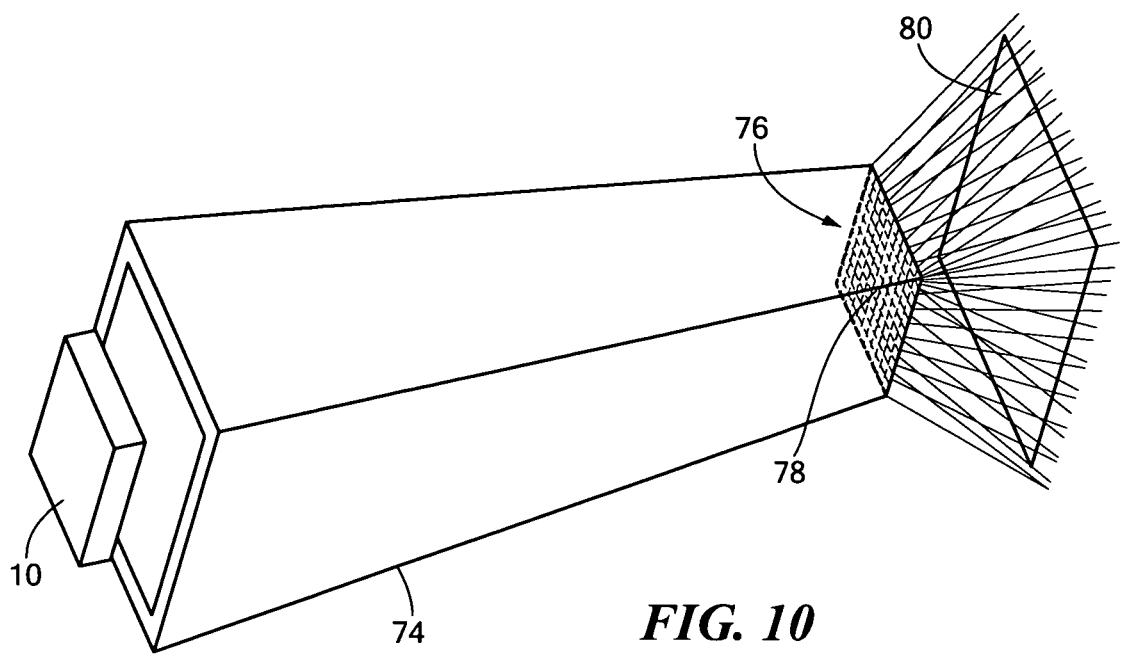
FIG. 10 is a schematic ray diagram suggesting the manner of light ray mixing in the homogenizer of FIG. 9 to obtain more spatial uniformity.
Figure 11:
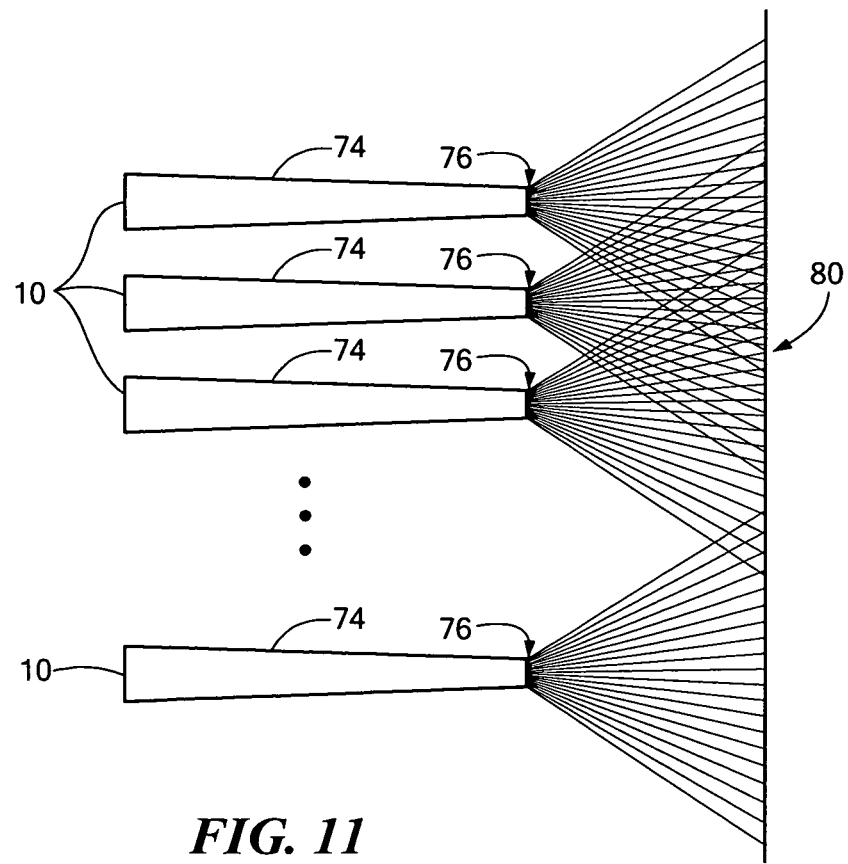
FIG. 11 is a schematic ray diagram illustrating the combined effect of a number of homogenizers on the illumination at the solar panel plane.
Figure 12:
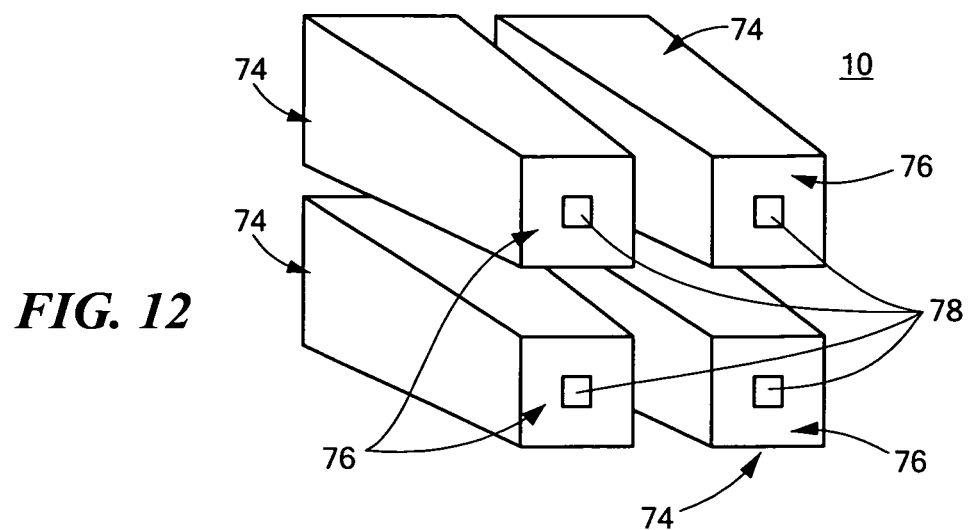
FIG. 12 is a three dimensional diagrammatic view of an LED block of FIG. 2 consisting of four LED sub-blocks of FIG. 3, according to one embodiment of the invention.
Figure 13:
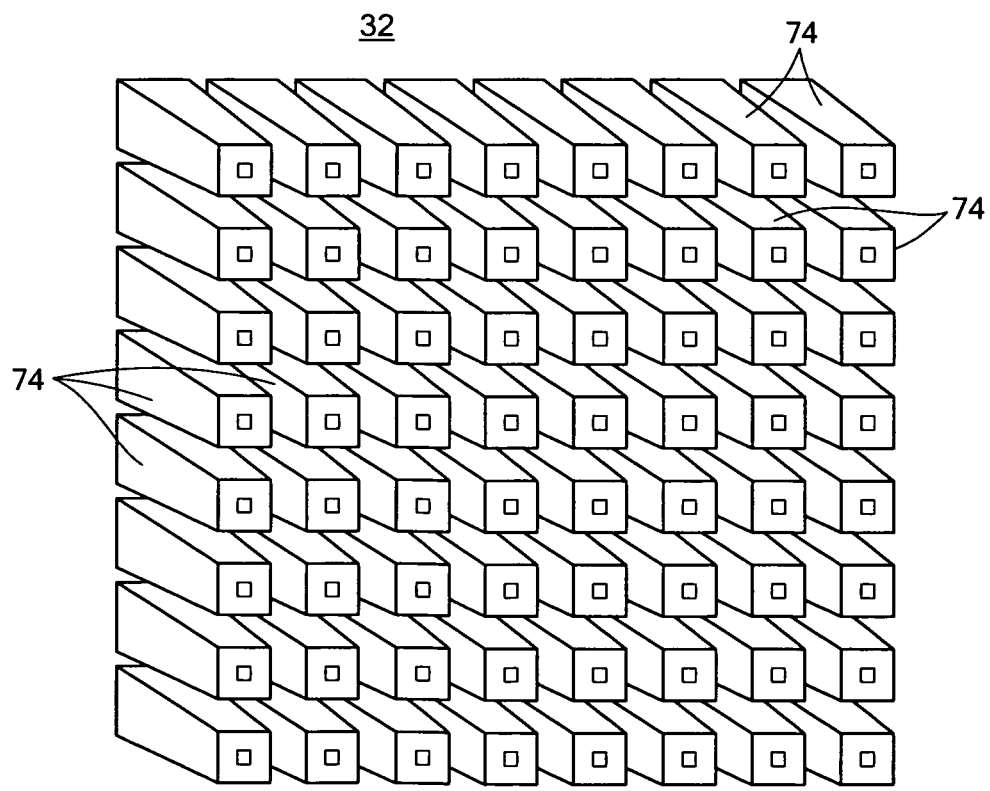
FIG. 13 is a three dimensional diagrammatic view of a tile of FIG. 3 consisting of sixteen LED blocks each of which is comprised of four LED sub-blocks for a total of sixty four sub-blocks according to one embodiment of the invention.

The light emanating from the LEDs with different wavelength must be homogenized and the intensity of the light should be uniform as it impinges on the solar cell or solar panel to be tested. This is accomplished in one embodiment of the invention by mounting the LED sub-block 10 on the metal core PCB 70, FIG. 8, and combining it using, for example, alignment pins 72, with a homogenizer 74, FIG. 9. As shown in FIG. 9, homogenizer 74 which provides the uniform spatial intensity is a non-imaging beam homogenizer. It also includes a lens system such as a micro-lens array 76 which also contains a device, for example, a retro reflective member 78, which reflects a portion of the light after homogenization back to the photo sensor device 28, which may be a surface mounted silicon photo diode. The light emanating from the LED chip of sub-block 10, FIG. 10, after homogenization by non-imaging tapered light pipe homogenizer 74 and passing through micro-lens array 78 provides a more uniform homogenized light output at the test plane 80 of the solar panel under test as illustrated more fully in FIG. 11 which shows a number of such homogenizers 74 acting with their associated sub-blocks 10 to provide the homogenized illumination effect at solar panel 80. FIG. 12 is three dimensional view of an LED block of FIG. 2 including four LED sub-blocks 10 of FIG. 3, and FIG. 13 shows a three dimensional view of the tile 32 of FIG. 3 including sixteen LED blocks 30 each which in turn includes four LED sub-blocks 10 for a total of sixty-four sub-blocks.

In accordance with one embodiment the LED driver system includes a capacitive circuit for periodically discharging power to the LEDs and recharging between those power discharges. Since the solar spectral density in the wave length interval of 400-1100 nm is about 760 W/m² or equivalently 76 mW/cm², the 20 cm×20 cm tile 32, FIG. 3, must produce close to 30 watts of optical power. Using a conservative average radiation production efficiency of η approximately equal to 10%, the electrical power to all the LEDs in the tile during a 100 ms flash would be about 300 W. Each 100 ms flash of the simulator would then deliver an energy of some 30 Joules to the LEDs. For power conversion efficiency this energy could come from a tile-mounted capacitor, initially charged to 400 V and discharged in the 100 ms interval to 200 V; the required value C of the capacitor is then found from:

$$\Delta E_{LED} = 30 \text{ J} = \frac{C}{2}400^2 - \frac{C}{2}200^2 = 6 \times 10^4 \ C \text{ so that} \quad (1)$$

$$C = \frac{30}{6 \times 10^4} = 500 \ \mu\text{F} \quad (2)$$

If this capacitor is discharged from 400 V to 200 V in 100 ms at a constant current $I_{LED}$, then $$\Delta Q = I_{LED}\Delta t = C\Delta V \text{ so that} \quad (3)$$

$$I_{LED} = 500 \times 10^{-6} \frac{200}{0.1} = 1 \text{ A} \quad (4)$$

To restore to the capacitor the same charge as was discharged in 100 ms, but in the 10 s between flashes, then a current of only one hundredth of the discharge current or 10 mA is required. For the 400 V main supply charging the capacitor banks of the 50 tiles constituting a 1 m×2 m solar simulator, a current capacity of about 500 mA is required: i.e., a 200 W supply.

Figure 15:
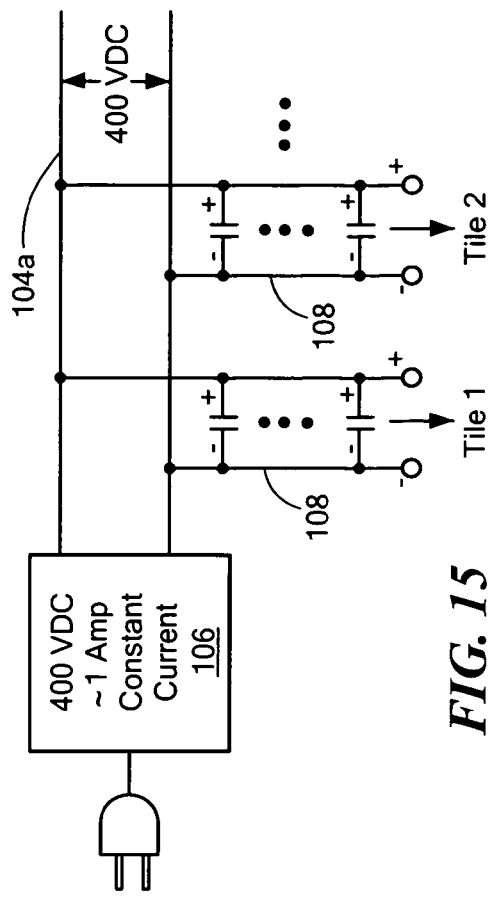
FIG. 15 is a schematic diagram of a DC charging bus for tile capacitor banks.
Figure 16:
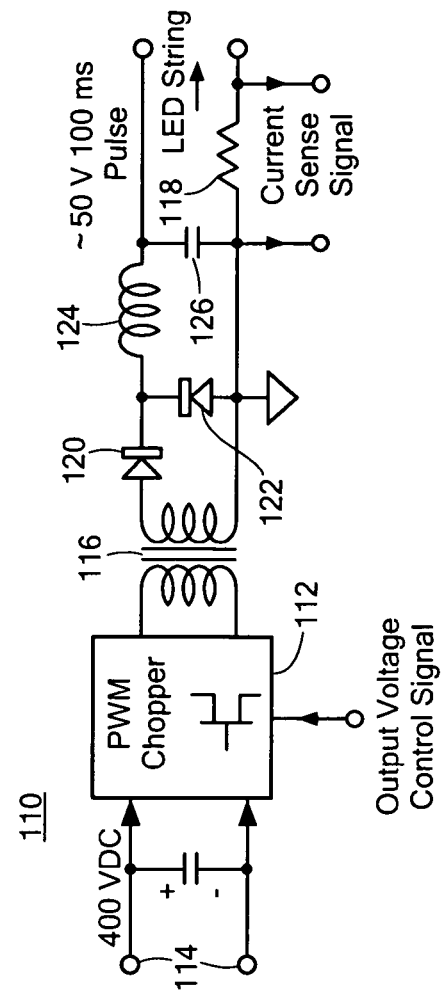
FIG. 16 is a schematic diagram of a DC-DC buck converter for driving series LED strings of common color range according to the invention.
Figure 14:
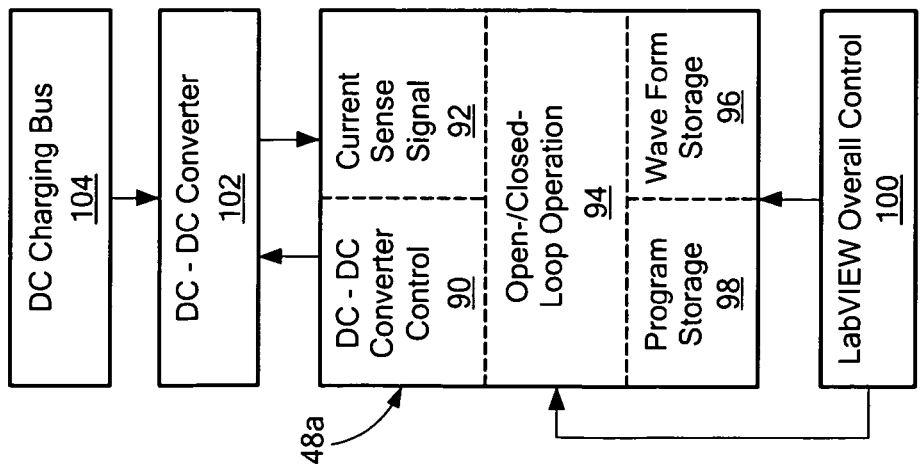
FIG. 14 is a block diagram of a micro-processor based controller for a single series LED string of common color range according to one embodiment of the invention.

A block diagram of one embodiment of a microprocessor-based controller 48a, FIG. 14, is configured to provide DC to DC converter control 90 as well as current sensing 92. It is capable of both open and close loop operation 94 and provides both wave form storage 96 and program storage 98 and may employ LabVIEW overall control software 100 as well as other software. It operates in conjunction with DC to DC converter 102 and DC charging bus 104. A more detailed view of the DC charging bus 104a, FIG. 15, shows a 400 V DC 1 amp current supply, 106 which provides a capacitive powered output 108 for each tile. A general schematic of a typical DC-DC buck converter 110, FIG. 16 includes a pulse width modulated chopper 112 which receives the 400 V DC at input 114 and employs an isolation transformer 116 which permits individual local grounding of the tiles. The fraction of the input 400 V appearing across the LED string is determined by pulse-width modulating (PWM) the chopper function via an external control signal. For purposes of feedback control, the output LED string current may be sampled by a current sensor resistor 118. Converter 110 also includes rectifying 120 and free-wheeling 122 diodes, inductor 124, and filter capacitor 126.

Figure 17:
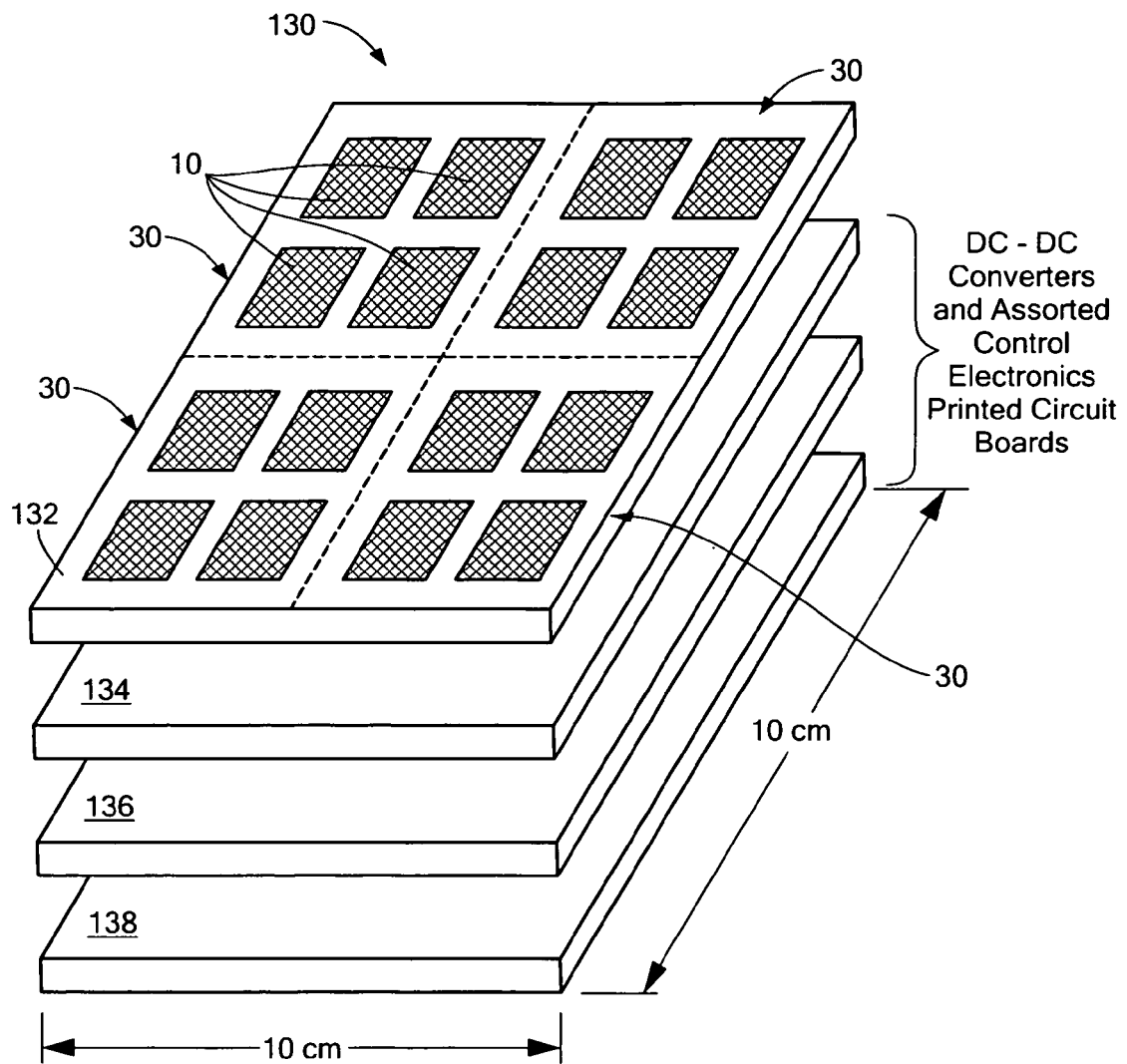
FIG. 17 is an exploded three dimensional view of an LED driver structure for a quarter tile shown in FIG. 3 in accordance with one embodiment of the invention.

In one embodiment the series strings of common color range LEDs are driven in groups of quarter tiles. A typical quarter tile LED driver structure 130, FIG. 17, includes the LED plane 132 including four blocks, each block including four sub-blocks 10 as well as three or more DC-DC converters and control electronics printed circuit boards 134, 136, and 138.

Figure 18:
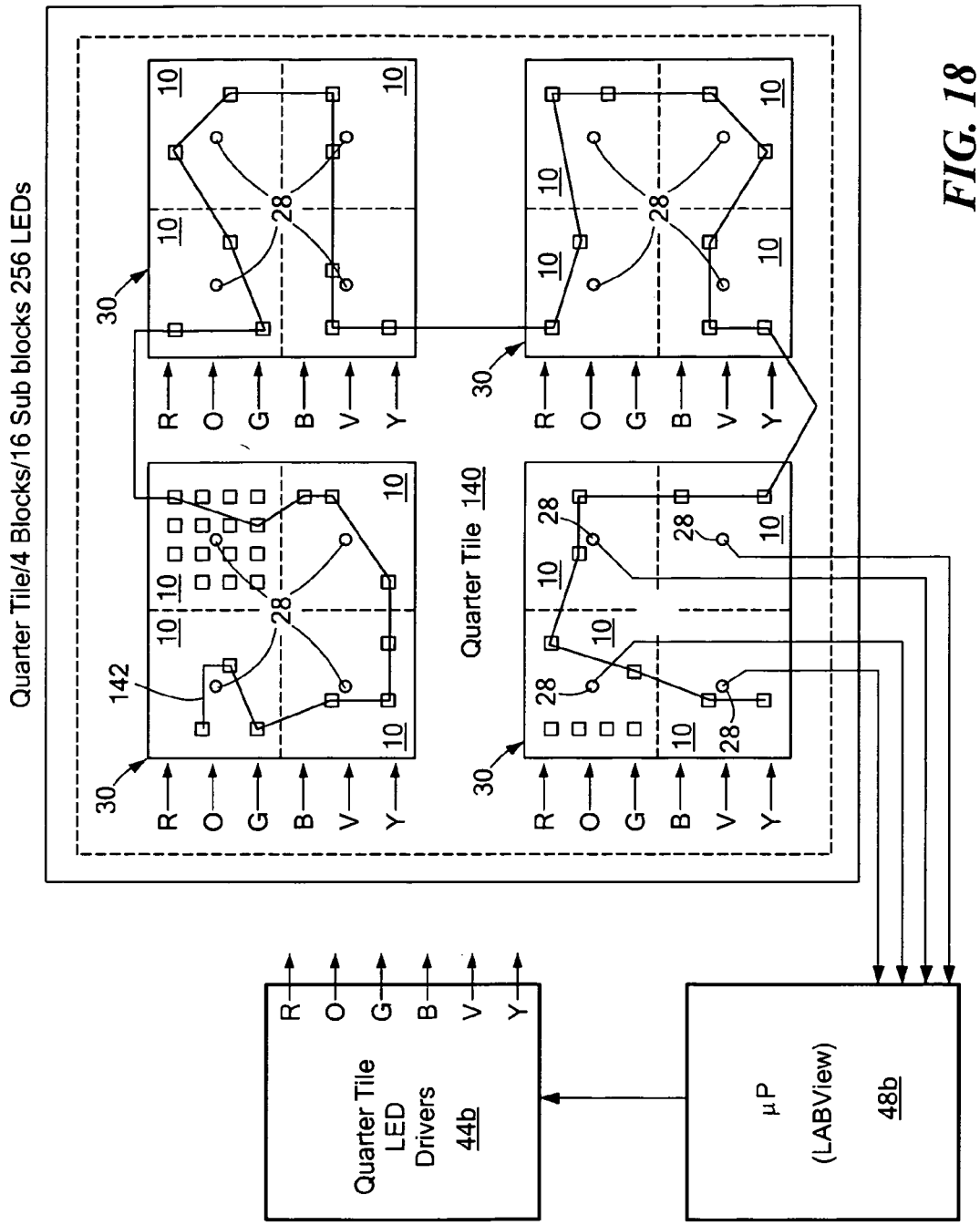
FIG. 18 is a schematic block diagram showing an arrangement of series strings of common color range which extend through the lowest order assemblies, e.g. sub-block LEDs, and their next higher order intermediate assemblies, e.g. blocks; four of which make up a quarter of the next higher intermediate assembly, e.g. a tile.

There is shown in FIG. 18 a schematic block diagram of an arrangement of series strings of common color ranges which extend through the lowest order assemblies, that is sub-block 10, and the next higher order intermediate assemblies blocks 34 which make up a quarter tile 140 of the next higher intermediate assembly, a tile 34. In this case the quarter tile might be regarded as an additional intermediate order assembly. Quarter tile LED driver 44b provides power to the 6 different series strings of common color range, red, R; orange, O; yellow, Y, green, G; blue, B; and violet, V. Power is provided separately to each of those strings to the LEDs in each sub-block 10 of each block 30 in quarter tile 140. To do this all of the LEDs in the same color range are connected together in a series string as indicated by the series string 142 which interconnects all of the red LEDs in each sub-block 10 of each block 30 in quarter tile 140. A similar string exists for orange, O, green, G, blue B, yellow Y and violet, V so that the LEDs of each different color range can be separately addressed for power, adjustment. Each sub-block 10 in each block 30 of quarter tile 140 also includes a photo sensor device 28 which provides input to controller microprocessor 48*b*.

The system can operate in a run mode and in a calibration mode. In the run mode controller microprocessor 48*b* responds to photo sensor devices 28 and compares the electrical signal spectrum to a predetermined norm to determine the "LED dark/light performance". In a calibration mode microprocessor controller 48*b* enables quarter tile LED drivers 44*b* to provide distinctively coded (e.g. a different electrical modulation frequency for each color) power to each of the series strings of common color range and then responds to the output from the sensor system including photo sensors 28 to determine the power of each common color range and compares the power of each of the common color ranges to the power of those colors for a desired solar spectrum. Controller 48*b* then operates LED drivers 44*b* to increase or decrease the power provided on the lines R, O, Y, G, B, V, as necessary.

In the run mode as indicated in FIG. 19 power is provided to the LEDs to illuminate the solar cell or solar panel under test 200, typically 100 ms of discharge, 10 seconds of charge. The output of the solar panel at this time is then examined to determine the solar panels' characteristics and quality. At the same time the system according to this invention may monitor its sensor system 202 and compare the LED performance to a predetermined norm 204, such as a "dark/light standard". If that standard is not met 206 an alert may be provided of a failure or failure trend and the power may be adjusted as necessary or LEDs or sub-blocks of LEDs may be replaced.

In a calibration mode LED drivers 44*b* under control of microprocessor controller 48*b*, FIG. 18, provide distinctively coded power input to each different series string of color range 220, FIG. 20. The coding may be any suitable coding technique: frequency, pulse code modulation, or any other coding approach. The sensor system including the implicated photo sensor devices are monitored 222, and the sensor system output power is decoded to distinguish the power of each of the different color ranges 224. The color power spectrum so obtained is compared to a desired solar power spectrum 226 and in response the power of the color series strings is selectively adjusted as necessary 228.

Alternatively, LED calibration may be implemented in such a manner that 1) the relative intensities of the R, O, Y, G, B and V serial strings of LEDs in e.g. a quarter tile 31, are adjusted to the desired solar spectral intensity ratios with the aid of a spectrometer preferably programmed to integrate over the six ASTM-defined wavelength intervals and return the relative intensity values; and 2) the LED-string current drive waveforms that produce constant light output intensity are recorded and saved in the waveform storage area 96 for possible use in the event that some LED light outputs might vary too much with constant current drive. Since a single photodiode sensor 28 is used to monitor all the colors within any given sub-block 10, the individual color LED strings will accordingly have to be sequentially selected for excitation. In this calibration mode the system operates in an optically closed-loop fashion: the LED light output of the selected color is monitored by the photodiode sensor 28 and the signal thus obtained is used to control 90 the LED serial string current driver 102 so as to provide constant light intensity. In the process the LED string current drive waveform is recorded and saved.

In the run mode as indicated in FIG. 19 power is provided to the LEDs to illuminate the solar cell or solar panel under test 200, typically for 100 ms of discharge and 10 seconds of recharge. The current vs. voltage output of the solar panel at the time is then measured to determine the solar panel's characteristics and quality. At the same time the system according to this invention may monitor its sensor system 202 and compare the aggregate LED intensity performance to a predetermined norm 204, such as a desired fraction of the intensity of one sun. If that standard is not met an alert may be provided of an actual failure or of a failure trend, so that the power may be adjusted as necessary or LEDs or sub-blocks of LEDs may be replaced. In the run mode the system no longer operates as an optically closed loop; instead the LED-string current sense signals 118 are now used to slave the LED serial string current drivers 102 to predetermined either constant values or stored waveforms 96, as determined by the desired degree of spectral conformity with the ASTM standard. The totalized signals of the photodiode sensors 28 of e.g. a quarter tile, can be used to monitor the total light intensity produced by the quarter tile.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An adjustable spectrum LED solar simulator system comprising:
   a multiplicity of LEDs of a number of different color (wavelength) ranges;
   an LED driver system for providing power to said LEDs, said LED driver system including a capacitive circuit for periodically discharging power to said LEDs and recharging between said power discharges;
   a sensor system for sensing the output of said LEDs; and
   a controller responsive to said sensor system for comparing the color spectrum of the output of said LEDs to a desired solar spectrum and enabling said driver system to selectively adjust the power to said LEDs to more closely match the desired solar spectrum.

2. The adjustable spectrum LED solar simulator system of claim 1 in which said LEDs are connected in series strings of common color range, and in which said LED driver system provides power separately to each of said series strings of common color range.

3. The adjustable spectrum LED solar simulator system of claim 2 in which said controller selectively adjusts the power to said series strings of common color range.

4. The adjustable solar simulator system of claim 1 further including a beam homogenizer system responsive to said LEDs for producing a more uniform spatial density.

5. The adjustable spectrum LED solar simulator system of claim 4 in which said beam homogenizer includes a non-imaging beam homogenizer.

6. The adjustable spectrum LED solar simulator system of claim 4 in which said beam homogenizer includes a lens system.

7. The adjustable spectrum LED solar simulator system of claim 6 in which said lens system includes a micro-lens array.

8. The adjustable spectrum LED solar simulator system of claim 1 in which said controller operates in a run mode to enable said LED driver system to periodically power said LEDs.

9. The adjustable spectrum LED solar simulator system of claim 8 in which in the run mode said controller monitors said sensor system and compares its output to a predetermined norm to determine LED dark/light performance.

10. The adjustable spectrum LED solar simulator system of claim 2 in which said controller operates in a calibration mode to provide distinctively coded power to each of said series strings of common color range, decodes said sensor system output to distinguish the power of each common color range and compares the power of each common color range to the power of those colors for a desired solar spectrum.

11. The adjustable spectrum LED solar simulator system of claim 1 in which said simulator system is a modular structure of hierarchal assemblies; the highest order assembly being the simulator system, the lowest order assembly including a subset of said multiplicity of LEDs, each higher order assembly including a number of the next lower order assemblies.

12. The adjustable spectrum LED solar simulator system of claim 11 further including a beam homogenizer system responsive to said LEDs for producing a more uniform intensity and color output.

13. The adjustable spectrum LED solar simulator system of claim 12 in which said beam homogenizer system includes a beam homogenizer device associated with each lowest order assembly.

14. The adjustable spectrum LED solar simulator system of claim 13 in which said sensor system includes a sensor device associated with each lowest order assembly.

15. The adjustable spectrum LED solar simulator system of claim 6 in which said sensor system further includes an optical device associated with each lowest order assembly to return a sample of the homogenized LED output to said sensor device.

16. The adjustable spectrum LED solar simulator system of claim 11 in which said LEDs are connected in series strings of common color range.

17. The adjustable spectrum LED solar simulator system of claim 16 in which said series strings of common color range are extended through at least said lowest order assemblies.

18. The adjustable spectrum LED solar simulator system of claim 17 in which there is at least one intermediate order assembly and said series strings of common color range extend through at least said one intermediate order assembly including its lower order assemblies.

19. An adjustable spectrum LED solar simulator system comprising:
a modular structure of hierarchical assemblies including a highest order assembly, a lowest order assembly and at least one intermediate assembly, each higher order assembly including a number of next lower order assemblies;
each lowest order assembly including a subset of LEDs;
an LED driver system for providing power to said subsets of LEDs;
a sensor system for sensing the output of said LEDs, said sensor system including a sensor device associated with each lower order assembly; and
a controller responsive to said sensor system for comparing the color spectrum of the output of said LEDs to a desired solar spectrum and enabling said driver system to adjust the power to said LEDs to more closely match the desired solar spectrum.

20. The adjustable spectrum LED solar simulator system of claim 19 in which said LEDs are connected in series strings of common color range.

21. The adjustable spectrum LED solar simulator system of claim 20 in which said LED driver system provides power separately to each of said series strings of common color range.

22. The adjustable spectrum LED solar simulator system of claim 21 in which said controller selectively adjusts the power to said series strings of common color range.

23. The adjustable spectrum LED solar simulator system of claim 19 further including a beam homogenizer system responsive to said LEDs for producing a more uniform density and color output.

24. The adjustable spectrum LED solar simulator system of claim 23 in which said beam homogenizer system includes a beam homogenizer device associated with each lowest order assembly.

25. The adjustable spectrum LED solar simulator system of claim 24 in which said sensor system further includes an optical device associated with each lowest order assembly to return a sample of the homogenized LED output to said sensor device.

26. The adjustable spectrum LED solar simulator system of claim 20 in which said series strings of common color range are extended through at least said lowest order assemblies.

27. The adjustable spectrum LED solar simulator system of claim 26 in which there is at least one intermediate order assembly and said series strings of common color range extend through at least said one intermediate order assembly including its lower order assemblies.

28. The adjustable spectrum LED solar simulator system of claim 19 in which said LED driver system includes a capacitive circuit for periodically discharging power to said LEDs and recharging between said power discharges.

29. The adjustable spectrum LED solar simulator system of claim 19 in which said controller operates in a run mode to enable said LED driver system to periodically power said LEDs.

30. The adjustable spectrum LED solar simulator system of claim 28 in which in the run mode said controller monitors said sensor system and compares its output to a predetermined norm to determine LED dark/light performance.

31. The adjustable spectrum LED solar simulator system of claim 20 in which said controller operates in a calibration mode to provide distinctively coded power to each of said series strings of common color range, decodes said sensor system output to distinguish the power of each common color range and compares the power of each common color range to the power of those colors for a desired solar spectrum.

32. The adjustable spectrum LED solar simulator system of claim 19 in which the highest order assembly includes the simulator system itself.

33. An adjustable spectrum LED solar simulator system comprising:
a multiplicity of LEDs of a number of different color (wavelength) ranges;

a modular structure of hierarchical assemblies, the highest order assembly being the simulator system, the lowest order assembly including a subset of said multiplicity of LEDs, each higher order assembly including a number of the next lower order assemblies;

an LED driver system for providing power to said LEDs;

a sensor system for sensing the output of said LEDs, said sensor system including a sensor associated with each lowest order assembly;

a beam homogenizer system responsive to said LEDs for producing a more uniform intensity and color output, in which the beam homogenizer system includes a beam homogenizer device associated with each lowest order assembly; and a controller responsive to said sensor system for comparing the color spectrum of the output of said LEDs to a desired solar spectrum and enabling said driver system to adjust the power to said LEDs to more closely match the desired solar spectrum.

34. An adjustable spectrum LED solar simulator system comprising:

a multiplicity of LEDs of a number of different color (wavelength) ranges;

an LED driver system for providing power to said LEDs;

a beam homogenizer system responsive to said LEDs for producing a more uniform spatial density, the beam homogenizer including a lens system;

a sensor system for sensing the output of said LEDs, said sensor system further including an optical device associated with each lowest order assembly to return a sample of the homogenized LED output to said sensor device; and a controller responsive to said sensor system for comparing the color spectrum of the output of said LEDs to a desired solar spectrum and enabling said driver system to adjust the power to said LEDs to more closely match the desired solar spectrum.

35. An adjustable spectrum LED solar simulator system comprising:

a modular structure of hierarchical assemblies including a highest order assembly, a lowest order assembly and at least one intermediate assembly, each higher order assembly including a number of next lower order assemblies;

each lowest order assembly including a subset of LEDs;

an LED driver system for providing power to said subsets of LEDs, said LED driver system including a capacitive circuit for periodically discharging power to said LEDs and recharging between said power discharges;

a sensor system for sensing the output of said LEDs; and a controller responsive to said sensor system for comparing the color spectrum of the output of said LEDs to a desired solar spectrum and enabling said driver system to adjust the power to said LEDs to more closely match the desired solar spectrum.

36. The adjustable spectrum LED solar simulator system of claim 35 in which in the run mode said controller monitors said sensor system and compares its output to a predetermined norm to determine LED dark/light performance.

37. An adjustable spectrum LED solar simulator system comprising:

a modular structure of hierarchical assemblies including a highest order assembly, a lowest order assembly and at least one intermediate assembly, each higher order assembly including a number of next lower order assemblies;

each lowest order assembly including a subset of LEDs;

an LED driver system for providing power to said subsets of LEDs;

a sensor system for sensing the output of said LEDs, said sensor system including a sensor device associated with each lowest order assembly;

a beam homogenizer system responsive to said LEDs for producing a more uniform density and color output, said beam homogenizer system including a beam homogenizer device associated with each lowest order assembly; and a controller responsive to said sensor system for comparing the color spectrum of the output of said LEDs to a desired solar spectrum and enabling said driver system to adjust the power to said LEDs to a desired solar spectrum and enabling said driver system to adjust the power to said LEDs to more closely match the desired solar spectrum.

38. The adjustable spectrum LED solar simulator system of claim 37 in which said sensor system further includes an optical device associated with each lowest order assembly to return a sample of the homogenized LED output to said sensor device.

* * * * *